(12) United States Patent  
Crosby et al.

(10) Patent No.: US 8,384,999 B1  
(45) Date of Patent: Feb. 26, 2013

(54) OPTICAL MODULES

(75) Inventors: David Nicholas Crosby, Oxford (GB); David Hayes, Rye (GB); Philip Andrew Greenhalgh, Robertsbridge (GB)

(73) Assignee: Cerr Limited, Wallingford (GB)

( * ) Notice: Subject to any disclaimer, the term of this patent is extended or adjusted under 35 U.S.C. 154(b) by 0 days.

(21) Appl. No.: 13/345,769

(22) Filed: Jan. 9, 2012

(51) Int. Cl.
*G02B 27/14* (2006.01)
*G02B 23/00* (2006.01)
*G02B 17/00* (2006.01)
*G02F 1/1335* (2006.01)
*G03B 21/00* (2006.01)

(52) U.S. Cl. .......... 359/631; 359/410; 359/732; 349/11; 353/11

(58) Field of Classification Search .......... 359/630–639, 359/404, 407, 409–410, 618–619, 625, 13–14, 359/727, 732; 345/7–9; 631/633, 640; 351/41–176, 351/205–206, 210, 221; 340/438, 980, 995.1, 340/815.47, 815.74; 349/11; 348/115; 353/11–12, 353/28, 119
See application file for complete search history.

(56) References Cited

U.S. PATENT DOCUMENTS

| | | | |
|---|---|---|---|
| 4,220,400 A | 9/1980 | Vizenor | |
| 4,545,646 A | 10/1985 | Chern et al. | |
| 4,767,186 A * | 8/1988 | Bradley et al. | 359/452 |
| 4,968,117 A | 11/1990 | Chern et al. | |
| 5,050,946 A | 9/1991 | Hathaway et al. | |
| 5,202,950 A | 4/1993 | Arego et al. | |
| 5,535,025 A | 7/1996 | Hegg | |
| 5,886,822 A * | 3/1999 | Spitzer | 359/630 |
| 5,991,085 A * | 11/1999 | Rallison et al. | 359/630 |
| 6,057,966 A * | 5/2000 | Carroll et al. | 359/630 |
| 6,157,291 A | 12/2000 | Kuenster et al. | |
| 6,222,677 B1 | 4/2001 | Budd et al. | |
| 6,236,511 B1 | 5/2001 | Brown | |
| 6,288,846 B1 * | 9/2001 | Stoner, Jr. | 359/666 |
| 6,353,503 B1 | 3/2002 | Spitzer et al. | |
| 6,607,286 B2 | 8/2003 | West et al. | |

(Continued)

FOREIGN PATENT DOCUMENTS

EP 0785457 A2 7/1997
EP 1798592 A2 6/2007

(Continued)

OTHER PUBLICATIONS

Aye T M, "Miniature Guided Light Array Sequential Scanning Display for Head Mounted Displays," Final Report to US Army CECOM, May 15, 1998. Retrieved on-line from http://handle.dtic.mil/100.2/ADA350745.

(Continued)

*Primary Examiner* — Dawayne A Pinkney
(74) *Attorney, Agent, or Firm* — Franklin & Associates International LLC; Matthew Lambrinos (57) ABSTRACT

An optical module for head mounted displays and other applications comprises: an optical substrate and optical superstrate having inter-engaging ridged surfaces. A reflective layer is formed on at least one of the surfaces. An index matching material may be located between the surfaces. A region that receives a projected image, from a projector, directs rays launched from the projector onto the ridged surfaces, so that in use a viewer perceives an augmented image. The augmented image comprising reflected rays from the projector and transmitted rays from an object located on an opposite side of the module to that of the viewer.

28 Claims, 8 Drawing Sheets

U.S. PATENT DOCUMENTS

| | | |
|---|---|---|
| 6,671,100 B1 | 12/2003 | McRuer |
| 6,714,174 B2 | 3/2004 | Suyama et al. |
| 7,079,318 B2 | 7/2006 | Shikama et al. |
| 7,209,097 B2 | 4/2007 | Suyama et al. |
| 7,336,244 B2 | 2/2008 | Suyama et al. |
| 7,418,202 B2 | 8/2008 | Biernath et al. |
| 7,506,987 B2 | 3/2009 | Nilsen |
| 7,513,674 B1 | 4/2009 | Donahue |
| 7,639,208 B1 | 12/2009 | Ha et al. |
| 7,656,585 B1 * | 2/2010 | Powell et al. ............... 359/630 |
| 7,686,497 B2 | 3/2010 | Kropac et al. |
| 7,688,347 B2 | 3/2010 | Dolgoff |
| 7,703,931 B2 | 4/2010 | Nilsen |
| 7,876,489 B2 | 1/2011 | Gandhi et al. |
| 7,936,519 B2 | 5/2011 | Mukawa et al. |
| 7,944,616 B2 | 5/2011 | Mukawa |
| 7,991,257 B1 | 8/2011 | Coleman |
| 2001/0033440 A1 * | 10/2001 | Togino ............... 359/883 |
| 2002/0021461 A1 * | 2/2002 | Ono et al. ............... 359/13 |
| 2002/0070904 A1 * | 6/2002 | Okuyama ............... 345/7 |
| 2003/0184868 A1 | 10/2003 | Geist |
| 2006/0119794 A1 * | 6/2006 | Hillis et al. ............... 351/205 |
| 2006/0132914 A1 | 6/2006 | Weiss et al. |
| 2007/0008624 A1 * | 1/2007 | Hirayama ............... 359/630 |
| 2007/0177275 A1 | 8/2007 | McGuire, Jr. |
| 2009/0051879 A1 | 2/2009 | Vitale et al. |
| 2009/0167651 A1 | 7/2009 | Minano et al. |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2010/0290127 A1 | 11/2010 | Kessler et al. |
| 2010/0321409 A1 | 12/2010 | Komori et al. |
| 2011/0007277 A1 | 1/2011 | Solomon |
| 2011/0050655 A1 | 3/2011 | Mukawa |
| 2011/0083741 A1 | 4/2011 | Munro |
| 2011/0083742 A1 | 4/2011 | Munro |
| 2011/0213664 A1 | 9/2011 | Osterhout et al. |
| 2011/0221656 A1 | 9/2011 | Haddick et al. |
| 2011/0226332 A1 | 9/2011 | Ford et al. |
| 2011/0227813 A1 | 9/2011 | Haddick et al. |
| 2011/0255303 A1 | 10/2011 | Nichol et al. |
| 2011/0286222 A1 | 11/2011 | Coleman |
| 2012/0002295 A1 * | 1/2012 | Dobschal et al. ............... 359/630 |

FOREIGN PATENT DOCUMENTS

| | | |
|---|---|---|
| EP | 1736812 B1 | 4/2010 |
| WO | 02/099509 A1 | 12/2002 |
| WO | 2007/019138 A1 | 2/2007 |
| WO | 2007014371 A2 | 2/2007 |
| WO | 20081109420 A2 | 9/2008 |
| WO | 2010033859 A2 | 3/2010 |
| WO | 20101062481 A1 | 6/2010 |
| WO | 20101123934 A1 | 10/2010 |
| WO | 2011/124897 A1 | 10/2011 |
| WO | 20111130715 A2 | 10/2011 |

OTHER PUBLICATIONS

UK Intellectual Property Office, Combined Search and Examination Report under Sections 17 and 18(3) of UK Patents Act 1977, dated May 8, 2012, issued on corresponding GB Patent Application GB1200312.6, to Cerr Limited, Inventors: Crosby, David Nicholas et al.

Corresponding GB Patent Application GB1200312.6 specification, filed Jan. 9, 2011, at UK Intellectual Property Office, to Cerr Limited, Inventors: Crosby, David Nicholas et al.

Corresponding GB Patent Application GB1200312.6 drawings, filed Jan. 9, 2011, at UK Intellectual Property Office, to Cerr Limited, Inventors: Crosby, David Nicholas et al.

* cited by examiner

OPTICAL MODULES

TECHNICAL FIELD

Embodiments' relate to optical apparatus and, more particularly but not exclusively, to optical modules and to head mounted displays including such optical modules.

BACKGROUND

As computing capabilities and processing speeds improve, and video graphic quality becomes ever more realistic, greater demands are being placed upon the head mounted display, so as to be able to provide increasingly higher definition projected images, faster response times and more accurate registration between projected images and images transmitted through the head mounted display.

A see-through, head mounted display presents to the wearer an optically aligned combination of a computer generated image (CGI) and a live image of a real world scene. Such an aligned image is often referred to as an augmented image. A head mounted display may be incorporated into a pair of goggles, a helmet or resemble a normal set of eyeglasses, for example for use in home entertainment systems.

See-through head-mounted display systems incorporate an optical module that overlays the computer generated image and real scene in a composite view. The computer generated image is usually produced from an optical projector that includes an electronic display and appropriate imaging optics, together these elements with an optical module, enable a viewer to perceive a computer generated image.

Examples of electronic displays are liquid crystal on silicon display (LCOS) displays, liquid crystal displays (LCDs), digital light processors (DLPs), organic light emitting diodes (OLEDs) and a scanning source consisting of a multiple axis scanning mirror system and red, green, blue (RGB) lasers or LED illuminators.

There is a need to provide improved optical modules and, head mounted display sets incorporating such improved optical modules, that operate efficiently and are adjustable to suit different users.

SUMMARY

According to a first aspect of the invention, there is provided an optical apparatus comprising an embedded ridged reflector module, wherein the module comprises an optical substrate and optical superstrate having inter-engaging ridged surfaces; a reflective layer formed on at least one of the surfaces; the reflective layer being partially reflective and partially transmissive; and a region that receives a projected image, from a projector, and directs output rays from the projector onto the ridged surfaces. The surfaces of the substrate and superstrate are freeform profiled to enable the reflector to operate in a directly reflective mode for directly reflecting the projected rays to the viewer. In use a viewer, located on a first side of the module, perceives an augmented image comprising reflected rays from the projector and transmitted rays from an object located on a second side of the module.

According to another aspect, there is provided a method of fabricating an optical embedded ridged reflector module. The method comprises the steps of: forming an optical substrate and optical superstrate having inter-engageable ridged surfaces; forming a reflective layer on at least one of the surfaces; the reflective layer being partially reflecting and partially transmissive; and placing respective first and second inter-engaging ridged surfaces adjacent one another so as, to achieve optical coupling. The method includes profiling the surfaces of the module including the inter-engageable surfaces so that the reflector operates in a direct reflective mode.

According to yet another aspect, there is a system provided for controlling and operating projectors which are located in a frame portion of a head mounted display, the head mounted display having a pair of the aforementioned embedded ridged reflector modules supported thereon, the system including a data transmitter, for transmitting data to the projector in the head mounted display.

BRIEF DESCRIPTION OF THE DRAWINGS

In order that the present invention may be more readily understood, reference will now be made to the accompanying drawings, in which.

DESCRIPTION OF PREFERRED EMBODIMENTS OF THE INVENTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Known modules incorporated into head mounted displays suffer from several drawbacks including the following. The head mounted display including the optical module are large and heavy. The optical modules are not able to transport a computer generated image and external scene to the wearer's eyes efficiently—that is with minimum attenuation and minimal distortion. Known head mounted displays are not adjustable to suit different users. For example, previously it has not always been easy to alter the distance between the focal plane of the computer generated image and the eye of the wearer.

Similarly the inter-ocular setting between the centers of left and right eyepieces has not always been possible. Furthermore, because head mounted displays have tended to be a 'one size fits all' and therefore little provision has been made to provide adjustable ophthalmic lenses in order to correct for vision defects (e.g. myopia) in some users.

Technical features described in this application can be used to construct various embodiments of optical apparatus and methods. In one approach, there is provided an optical apparatus comprising an embedded ridged reflector module, wherein the module comprises an optical substrate and optical superstrate having inter-engaging ridged surfaces; a reflective layer formed on at least one of the surfaces; the reflective layer being partially reflective and partially transmissive; and a region that receives a projected image, from a projector, and directs output rays from the projector onto the ridged surfaces. The surfaces of the substrate and superstrate are freeform profiled to enable the reflector to operate in a directly reflective mode for directly reflecting the projected rays to the viewer. In use a viewer, located on a first side of the module, perceives an augmented image comprising reflected rays from the projector and transmitted rays from an object located on a second side of the module.

By providing an embedded ridged reflector module having a partially reflective and partially transmissive layer formed on inter-engaged ridged surfaces of the superstrate and substrate and profiling the module surfaces to provide a reflector operating in direct reflective mode, the module enables an aligned composite of a computer generated and real scenes with non-intrusive or objectionable aberrations and distortions to be provided in head mounted devices whilst meeting eye relief, field of view (FOV) and eye box requirements. The optical module structure lends itself to convenient mass production and can be made sufficiently small in depth to enable it to be used in eyeglass type headsets. The thickness of the optical modules is typically between 2 mm and 5 mm.

In one embodiment, the optical apparatus has a complementary freeform lens adapted and arranged between the projector and embedded ridged reflector module for conditioning the output rays from the projector to pre-compensate for optical aberrations resulting from the embedded ridge reflector module. The light from the projector passes through the separate freeform lens before it falls upon the reflecting portion of the optical module. The freeform lens is used to compensate for the aberrations and distortions inherent in an off-axis optical projection system as described hereinafter. The freeform lens is dimensioned and arranged to direct light from the optical module to a region between the viewer's eye and the optical module in a zone that is often referred to as the 'eye-box'. The eye-box is a zone within which a viewer is able to see the projected image of the object with the full field of view without observable vignetting.

In one example of the embedded ridged reflector module, the module is a flat embedded ridge reflector module, the inter-engaged ridged surfaces being formed on flat planar inner faces of the optical substrate and optical superstrate.

In another embodiment, the embedded ridged reflector module is a freeform curved embedded ridge reflector module, and the substrate and superstrate in the module are freeform curved. The inter-engaged ridged surfaces are arranged on freeformed curved inner faces of the optical substrate and the optical superstrate. The substrate has a freeformed curved outer face on the first side of the module and the superstrate has a freeformed curved outer face on the opposite side of the module.

By judiciously varying the pitch, height, spacing and freeform profile of the substrate and superstrate surfaces including the inter-engaging surfaces the optical characteristics of the optical modules can be altered to control specific optical parameters such as magnification power, focal length, and corrective power for vision correction.

In one example, the reflector layer formed on the at least one inter-engaging surface of the aforementioned modules comprises reflective material deposited on the at least one surface. The reflective layer in one example is selectively deposited on the inter-engaged ridged surfaces such that the reflective layer is omitted from flyback surfaces of the ridged surfaces. Alternatively, the reflective layer is an air layer or gap.

Indexing matching material may be located between the inter-engaged ridged surfaces as needed. The ratio of reflectivity to transmission of the reflective layer may be adjustable electronically.

In one embodiment, the optical apparatus comprises a pair of the aforementioned embedded ridged reflector modules and a head mounted display, such as but not limited to an eyeglass type head mounted display. The pair of modules may be spaced apart, for example so that their centers are between 4 cm-15 cm apart.

In one embodiment, motion sensors are arranged on the head mounted display to detect motion about three independent axes. The motion sensors are for example accelerometers that are arranged to detect pitch, roll and yaw.

In yet another embodiment, a nose bridge, which may be adjustable, connects the pair of optical modules and permits signals to pass to and from each module.

In yet another embodiment, the optical apparatus includes electronic circuitry for pre-conditioning an image-forming device of the projector to reduce residual aberrations after optical conditioning.

In yet another embodiment, the optical apparatus includes an electronic controllable variable focusing device arranged in the projected ray path for positioning the image plane of the computer generated image between infinity and, say, about 30 cm from the front surface of the module.

In yet another embodiment, the optical apparatus includes an electronic controllable variable focusing device provided on one or more surfaces of the embedded ridged reflector module for enabling adjustment of the image for in focus viewing by a long sighted or short sighted user or a user having astigmatic vision defects.

In one embodiment, the adjustable nose bridge connects the pair of optical modules and permits signals to pass to and from each module. The nose bridge is adjustable, for example, to approximately ±15 mm so that the inter-pupilliary distance of the lenses of the head mounted display can be worn by children and adults. One example of an adjustment mechanism for the nose bridge is a ratchet. Another adjustment mechanism is a shaped memory alloy (SMA) or shape memory polymer which has been set for different users and is able to be switched from one state to another by way of a heating current.

In one example, data for controlling and operating projectors, which are typically located in a frame portion of the head mounted display, is transmitted via a hard wire connection from a central processing station. This central processing station, sometimes referred to as an entertainment or gaming system includes components such as microprocessors for processing software as well as other computer peripherals such as random access memory (RAM) and transducers for converting electrical signals into data. The central processing station, in use, may be connected to the Internet (so enabling remote players to participate in a game) as well as having bespoke software handling capabilities, audio and graphics hardware and software. Optionally the central processing station has facilities for reading data from digital versatile disc (DVD) and compact discs (CDs) as well hard disc data storage capabilities.

In one example, the data that is generated by the central processing station is sent to the head mounted display and drives projectors that project images on the optical modules. All the data may be transmitted to the head mounted display via a broadband connection, such as a multi-cored wire connection or an optical fiber. Separate optical fibers are provided for driving the left and right projectors in respective optical modules. In the example in which an adjustable data nosebridge is adopted, only a single fiber or cable to the glasses is required. An advantage of using fiber optical connections is that they are lightweight and as a result of their high bandwidth are capable of transmitting multiplexed optical data signals.

In an alternative data transfer device a short-range, low power radio frequency transmitter and receiver are deployed either side of the nose bridge in such a fashion that data can be transmitted from a left hand optical module to a right hand optical module or vice versa.

The substrate and superstrate may have a refractive index between 1.6-1.95, and may lie between 1.7 and 1.9, and may be approximately 1.85.

Advantageously a characteristic dimension, such as a length/width or major/minor axis or the diameter of the substrate and superstrate may be between 20 mm and 100 mm and the substrate and superstrate may be between 45 mm and 65 mm.

The number of ridges depends on the pitch and module width. For example for inter-engaged ridged reflective surfaces around 0.15 mm in pitch a 50 mm module has over 300 ridges. In one example, the material that forms the optical elements is a synthetic plastics material, for example optical grades of Poly(methyl methacrylate) (PMMA) or Polycarbonate.

Advantageously an anti-jitter sensor and compensator system may be included in the head mounted display. Such an optical system comprises: a processor for processing signals received from motion sensors and a compensator adapted to compensate an image, in accordance with signals received from the motion sensors.

The motion sensors may be solid state gyroscopes or accelerometers, which can be used to detect a motion of the head mounted display, for example as required by many action or exercise games. The processor may be arranged to derive sensing signals from one or accelerometers and feed forward compensation signals to an image generator.

A variable focusing device in projection path is optionally included in the head mounted display and employs one or more micro electrical mechanical systems and electronic lens.

Another advantage of the optical module is that the intensity of incident light, across a broad spectrum, is substantially constant. This characteristic is sometimes referred to as the intensity profile and it is ideally constant so that the wearer of the head mounted display, sees colors without any chromatic aberration or signal loss. An advantage of this feature is that the wearer sees all colors in a scene as they would normally perceive them.

Advantageously an eye tracking device may be included in the head mounted display for monitoring eye movement and providing a feedback signal to the system. This signal may be used as part of a feedback signal to the processor for modifying a computer generated image or it may be used for other purposes, such as to determine eye strain through excessive use.

In another approach, there is provided a method of fabricating an optical embedded ridged reflector module. The method comprises the steps of: forming an optical substrate and optical superstrate having inter-engageable ridged surfaces; forming a reflective layer on at least one of the surfaces; the reflective layer being partially reflecting and partially transmissive; and placing respective first and second interengaging ridged surfaces adjacent one another so as to achieve optical coupling. The method includes profiling the surfaces of the module including the inter-engageable surfaces so that the reflector operates in a direct reflective mode.

By forming a partially reflective and partially transmissive layer on inter-engaged ridged surfaces of the superstrate and substrate and profiling the module surfaces in the aforementioned manner, the module enables an aligned composite of a computer generated and real scenes with non-intrusive or objectionable aberrations and distortions to be provided in head mounted devices whilst meeting eye relief, FOV and eye box requirements. The optical module structure lends itself to convenient mass production. By virtue of the arrangement of the inter-engaging surfaces, the modules can be made sufficiently compact to enable them to be used in eyeglass type headsets.

During the fabrication process portions of the substrate and superstrate may be removed in order to modify the optical properties of the optical module.

In one particularly method, a master mold is used to prepare an optical module, the module comprises: a substrate and a master mold is used to prepare superstrate; a reflective coating is formed on at least one surface of either the substrate or the superstrate as described in detail below.

When the substrate is placed adjacent the superstrate, the optical module is placed in a preform whose form it takes up, either by way of pressing and/or heating so that the preform takes up the curvature of the mold. Such a process is employed to mass-produce the optical modules for the head mounted display.

Variation may be made to the eccentricity of the curvature of the substrate and superstrate in order to vary the optical power of the module. In this case the module can also perform as a corrective lens to compensate for ophthalmic conditions enabling a sharp see-through experience. One way in which this is achieved is to employ a computer controlled multi-axis lathe or milling machine to machine portions of the substrate and superstrate into specific and pre-determined shapes.

An advantage of the invention is that the performance parameters of individual substrate and superstrate may be made to suit persons who may have previously had to wear prescription glasses in order to use such head mounted displays. Due to the freeform nature of the optical module it can readily optimised for complex vision defects such as astigmatism and presbyopia that require non-symmetric lens profiles such as varifocals.

In addition to electrically controlled attenuation of the external scene, dynamic focus of the computer generated image and adjustment for the prescription requirements of the wearer are also constructed into the optical module.

Embodiments of the invention, will now be described in more detail, by way of examples, and with specific reference to FIGS. 1 to 11. Specific reference to components, process steps, and other elements are not intended to be limiting. Further, it is understood that like parts bear the same reference numerals, when referring to alternate Figures.

It will be further noted that the Figures are schematic and provided for guidance to the skilled reader and are not necessarily drawn to scale. Rather, the various drawing scales, aspect ratios, and numbers of components shown in the Figures may be purposely distorted to make certain features or relationships easier to understand.

Figure 1:
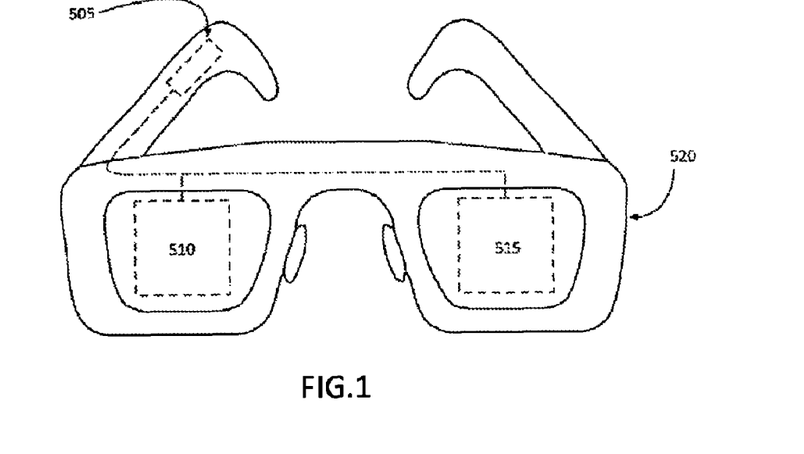
FIG. 1 shows an eye-glass type see-through head-mounted display system in accordance with an embodiment of the invention.

Referring now to FIG. 1, which shows a head-mounted display system that takes the form of a pair of conventional eyeglass (spectacle) frames and is an example of a typical video-display eyewear device. The device is used in conjunction with a video entertainment system and includes see-through optical modules 510 and 515 which also project computer generated images for view by the wearer. In particular, the computer generated images are projected directly in front of the wearer's eyes. The system includes a wearable mount or frame 520, which positions the see-through optical modules a short distance in front of the wearer's eyes.

See-through optical modules 510 and 515 may be partly transparent for see-through applications so that the wearer can view an external scene as well as a display image.

In another embodiment, optical modules 510 and 515 may be opaque to external scenes (i.e. not see-through) to suit applications where only a computer generated image need to be presented.

Alternatively, see-through optical modules 510 and 515 may have electrically adjustable partial reflectors so that the ratio of computer generated image to external scene brightness can be controlled. A liquid crystal layer may be incorporated as an alternative technique of achieving this. Sensors may be provided to detect ambient levels of brightness and these may be arranged to control automatically the amount of light. Alternatively, or in addition to this, a manual setting may be provided so that users may select the levels of ambient light from the external scene.

Referring again to FIG. 1, the system includes a controller 505, which controls components 510 and 515 in order to form the display images and enable the viewing of the external scene. In one embodiment, controller 505 may be adapted to cause see-through optical modules 510 and 515 to project the same computer generated image concurrently, so that the wearer's right and left eyes receive the same image at the same time. In another embodiment, the see-through optical modules 510 and 515 may project slightly different computer generated images concurrently, thereby creating depth of an image, so that the wearer perceives a stereoscopic or three-dimensional image.

Figure 2:
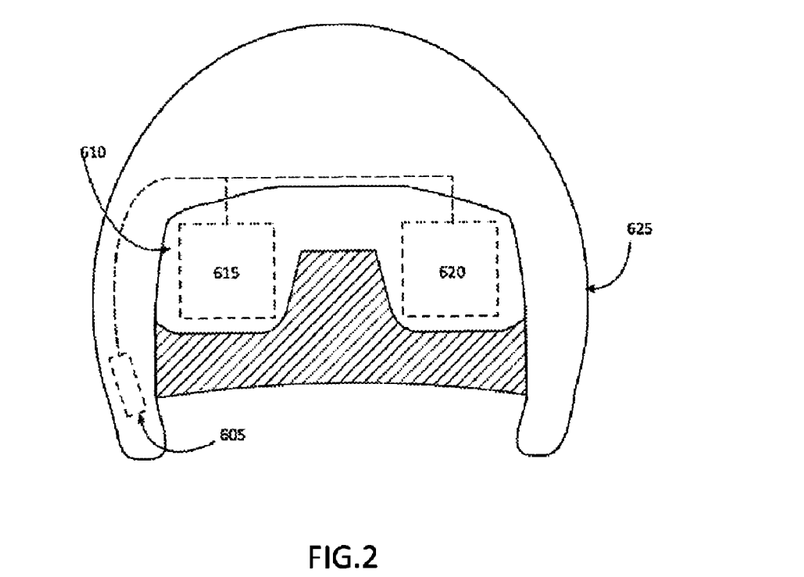
FIG. 2 shows an example of a helmet type see-through head-mounted display system in accordance with an embodiment of this invention.

FIG. 2 shows another example of a head-mounted display that comprises a helmet having a visor 610 behind which see-through optical modules devices 615 and 620 are arranged. This system may be used in applications ranging from video gaming to aviation (whether for actual flying or for use in flight simulators). Other wearable mounts that carry see-through optical modules 615 and 620 are possible including wrap-around headbands and visors.

In this embodiment a portable power supply (not shown) may be provided, which has rechargeable batteries and so enables the wearer to be able to wear the head mounted display without any cumbersome wires or power cables.

Figure 3:
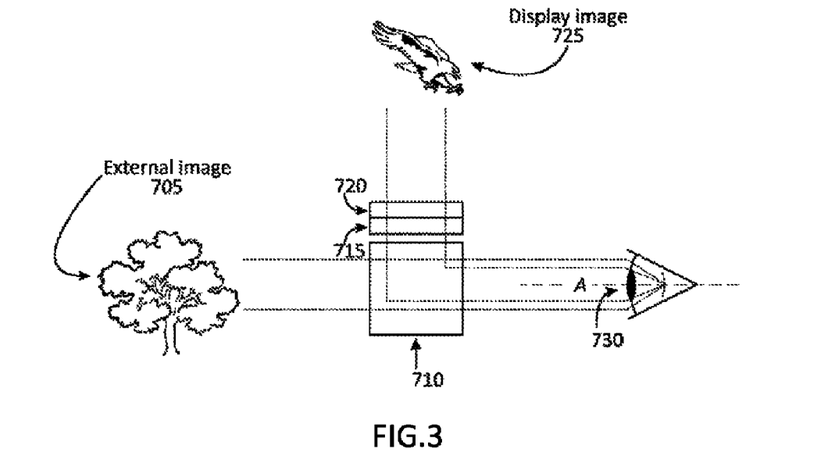
FIG. 3 is a simplified schematic of optical components in a see-through head mounted display.

FIG. 3 shows a simplified optical schematic of a see-through optical module. The display device includes an illuminator 720 and image former 715. In one embodiment, the illuminator 720 comprises a white-light source, such as a white light-emitting diode (LED). Alternatively separate red, green and blue LEDs may be used.

The illuminator may further comprise suitable optics for collimating the emission of the light source and directing the emission to the image former. The image former also comprises a rectangular array of light valves, such as a liquid-crystal display (LCD) array or array of light reflectors such as a liquid crystal on silicon (LCOS). The light valves or reflectors of the array may be arranged to spatially vary and temporally modulate the amount of light transmitted or reflected, such as to form pixels of the display image.

Other forms of variable amounts of light transmission and/or reflectance may be achieved using a light deflector. Here an array of micromachined reflectors form pixels of the display image by either directing the reflected light out through the projection optics (bright pixels) or by dumping the illumination internally in a light sink (dark pixels).

Further, the image former may comprise suitable light-filtering elements in registration with the light valvus, so that a color display image may be formed, by operating these in synchronism.

In another a further embodiment, the illuminator 720 may comprise one or more modulated lasers or LEDs, and the image former may be configured to raster the emission of the illuminator in synchronicity with the modulation to form the display image.

In yet another embodiment, image former 715 may comprise a rectangular array of modulated color LEDs arranged to form the display image. As the color LED array emits its own light, illuminator 720 may be omitted from the display device.

For brevity in the embodiments considered hereafter, the display device comprising image former 715 (and illuminator 720 when present) is termed the projector. The word projector is assumed to encompass all derivatives of miniaturized projection devices including micro projectors, pico projectors and femto projectors and any other variants.

Continuing with FIG. 3, the projector is arranged to project the display image 725 into see-through optical module 710.

The see-through optical module is configured to relay the display image to pupil 730 of the wearer of the head-mounted display system in which the see-through optical module is installed. The see-through optical module is also configured to transmit an external scene of scene 705 to the viewer's pupil. In this manner, the see-through optical module may be configured to overlay both the display image and the external scene along the same axis A to the pupil.

To relay the display image as well as transmit the external scene to pupil 730, the see-through optical module 710 may comprise a structure that is both partly reflective and partly transmissive. The ratio between the partial reflectance and partial transmission may be adjusted during fabrication or may be electrically controllable during use to enable adjustment of the relative brightness of the computer generated image and the external scene.

Figure 4:
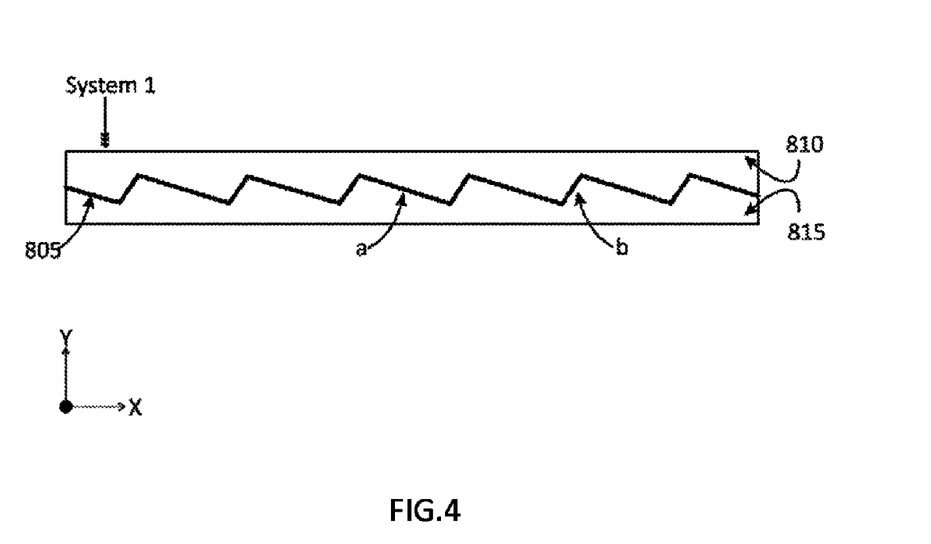
FIG. 4 shows one example of the invention called the flat embedded ridged reflector (FERR) according to an embodiment.

FIG. 4 shows system 1 of a particularly embodiment of a see-through optical module and is hereinafter referred to as a flat embedded ridge reflector (FERR). The FERR consists of an optically transparent substrate 815 that has multiple ridges formed on its upper surface. The ridged surface may be any type of serrated surface having multiple ridges that are arranged and adapted to perform the optical functionality described herein with reference to the embodiments.

The pitch and amplitude of the ridges vary depending on the application, but may be selected in the range 10 μm to 25 mm in pitch (along axis x) and 2 μm to 5 mm in amplitude (along axis y).

The ridged surface is coated with a layer 805 that is partially reflective at visible wavelengths and 810 is a complimentary optically transparent superstrate that is a close refractive index match to substrate 815.

Figure 8:
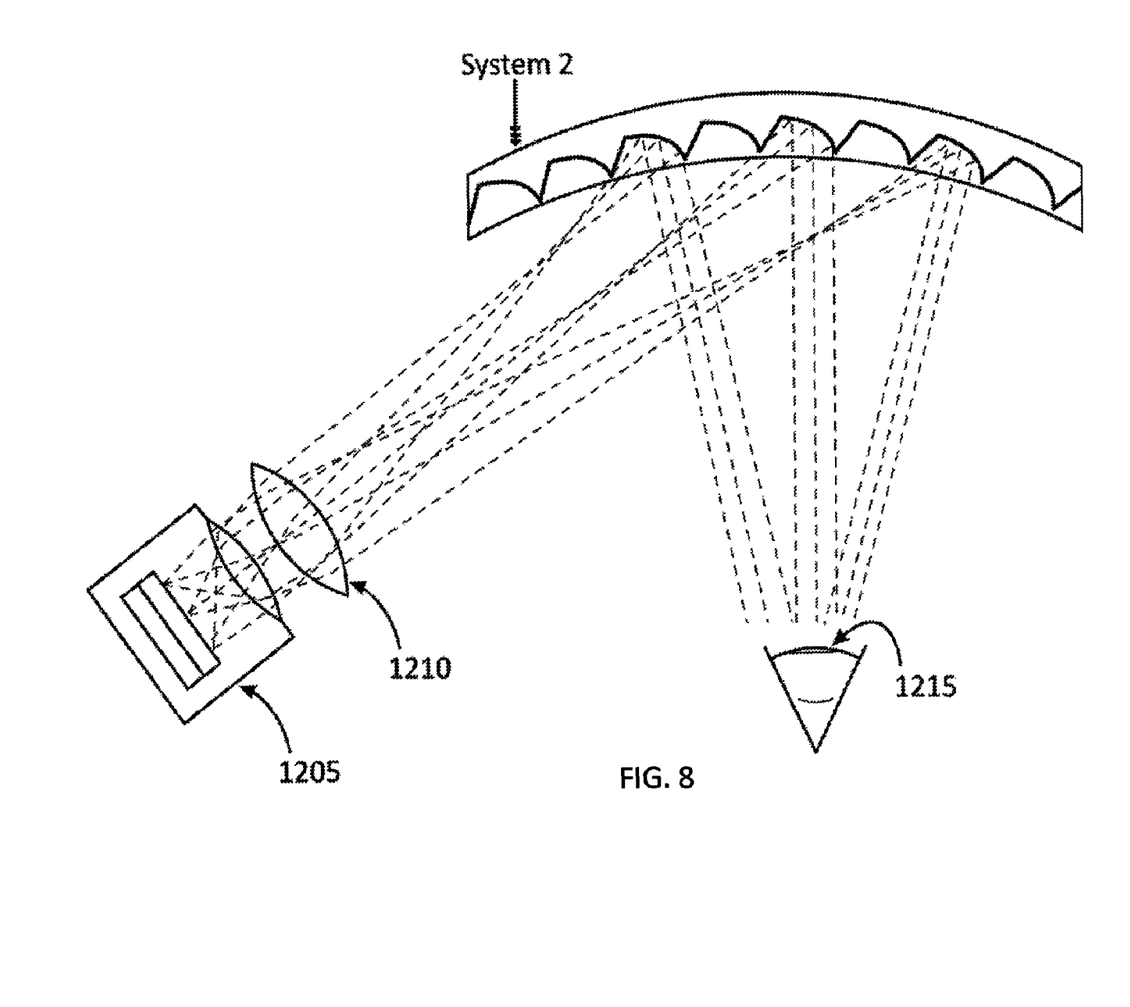
FIG. 8 is a ray diagram that shows how the CERR can be used as an imaging system for a head mounted display according to an embodiment.

The ridged surfaces of the optical substrate 815 inter-engage complimentary ridged surfaces of the optical superstrate 810, for example as shown in FIG. 8. The substrate and superstrate ridged surfaces may be interengaged by placing the ridged surfaces contiguous or in proximity with one another so that the ridges overlap but may not necessarily be in contact with one another.

The FERR is an example of a freeform optical structure as the shape of the embedded ridged reflectors has multiple degrees of freedom and may not be symmetric about any axis.

Figure 5:
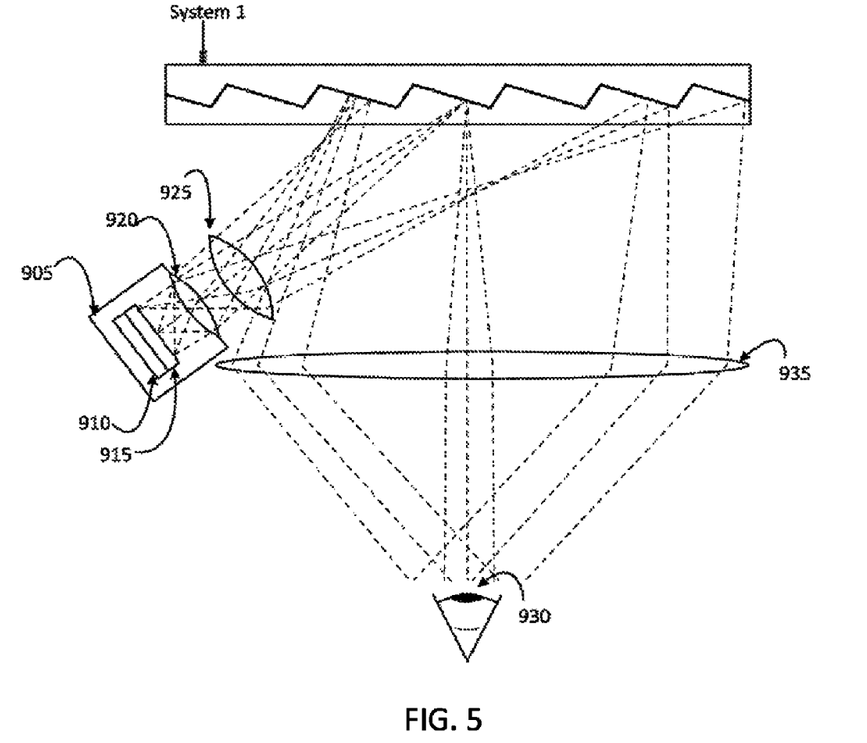
FIG. 5 is a ray diagram that shows how the FERR can be used as an imaging system for a head mounted display according to an embodiment.

FIG. 5 shows how the FERR may be incorporated into a see-through optical module for use in head mounted displays. The optical output from computer generated image projector 905 is introduced into the see-through optical module through a freeform lens system 925. The beam conditioned output from 925 illuminates the FERR, System 1, and is reflected onto a second freeform lens system 935. The combination of freeform optical entities 925, System 1 and 935 ensure that the output from the projector 905 is corrected for distortion and correctly presented to the eye pupil 930 with a large field of view and eye motion box.

Figure 6:
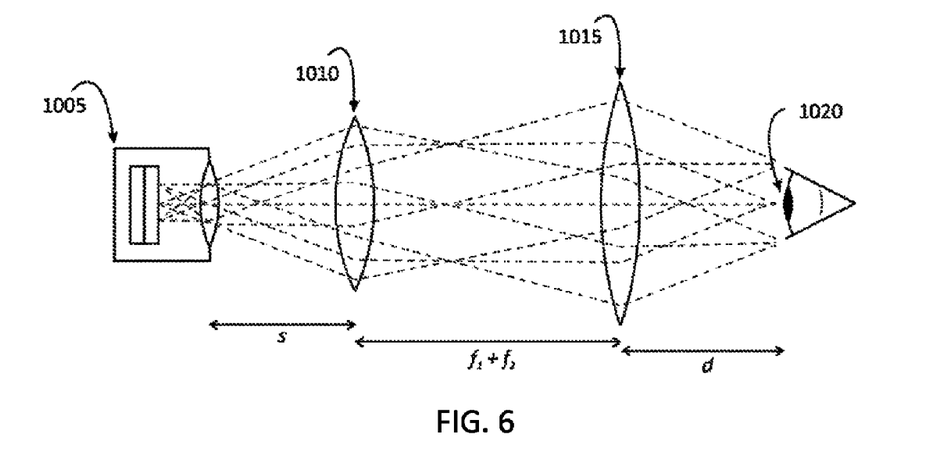
FIG. 6 is a simplified optical diagram that represents the system of FIG. 1 and approximates to FIG. 5.

FIG. 6 shows the optical equivalent of FIG. 5 with a simplified ray diagram with the FERR omitted for clarity. In this simplified model the FERR is considered as a relay reflecting device that enables the projector system 1005 and eye pupil 1020 to be located on separate optical axes. However, in other respects this ray diagram does not contribute to the geometry of the ray paths and image magnifications, but is shown in order to assist in understanding the invention.

The analysis of this optical system, shown in FIG. 5 and schematically represented by FIG. 6 follows assuming thin lens and small angle approximations:

Define:
$w_p$ is the radius of the projection system 1005 exit pupil
$w_1$, is the radius of the first lens 1010
$w_2$ is the radius of the second lens 1015
$w_{eye}$ is the radius of the eye motion box
s is the distance between the projection system 1005 and the first lens 1010
$f_1$ is the focal length of the first lens 1010
$f_2$ is the focal length of the second lens 1015
d is the distance between the second lens 1015 and the eye pupil 1020
$\theta_p$ is the half angle of the projection system 1005 output
$\theta_{FOV}$ is the field of view half angle of System 1

$$\text{Transverse magnification: } M = \frac{f_2}{f_1}$$

The radius of the eye motion region (noting that the eye motion box is the largest rectangular that fits within the region) is given by:

$$w_{eye} = M w_p$$

$$w_{eye} = \frac{f_2}{f_1} w_p$$

$$d = f_2\left(1 + \frac{f_2}{f_1}\right) - s\left(\frac{f_2}{f_1}\right)^2$$

$$\theta_{FOV} = \frac{f_1}{f_2} \theta_p$$

$$w_1 \cong w_p + s\theta_p$$

-continued $$w_2 \cong \theta_p\left(f_1 + f_2 - \frac{sf_2}{f_1}\right) + w_p\left(\frac{f_2}{f_1}\right)$$

As an illustration, using d=15 mm, $w_p$=4.5 mm and $\theta_p$=25° gives:
$w_{eye}$=2.8 mm
$\theta_{FOV}$=41°

| $f_1$ (mm) | $f_2$ (mm) | S (mm) | $w_1$ (mm) | $w_2$ (mm) |
|---|---|---|---|---|
| 15.00 | 9.38 | 0.60 | 4.77 | 13.49 |
| 20.00 | 12.50 | 13.60 | 10.55 | 13.49 |
| 25.00 | 15.63 | 26.60 | 16.34 | 13.49 |
| 30.00 | 18.75 | 39.60 | 22.12 | 13.49 |
| 35.00 | 21.88 | 52.60 | 27.91 | 13.49 |

These values, whilst quite plausible are relatively large and do not lend themselves well to a compact structure such as a head mounted display.

Consequently, one embodiment to this disclosure combines the function of optical component System 1 and 935 into a single optical element. This element is the curved embedded ridge reflector (CERR).

Figure 7:
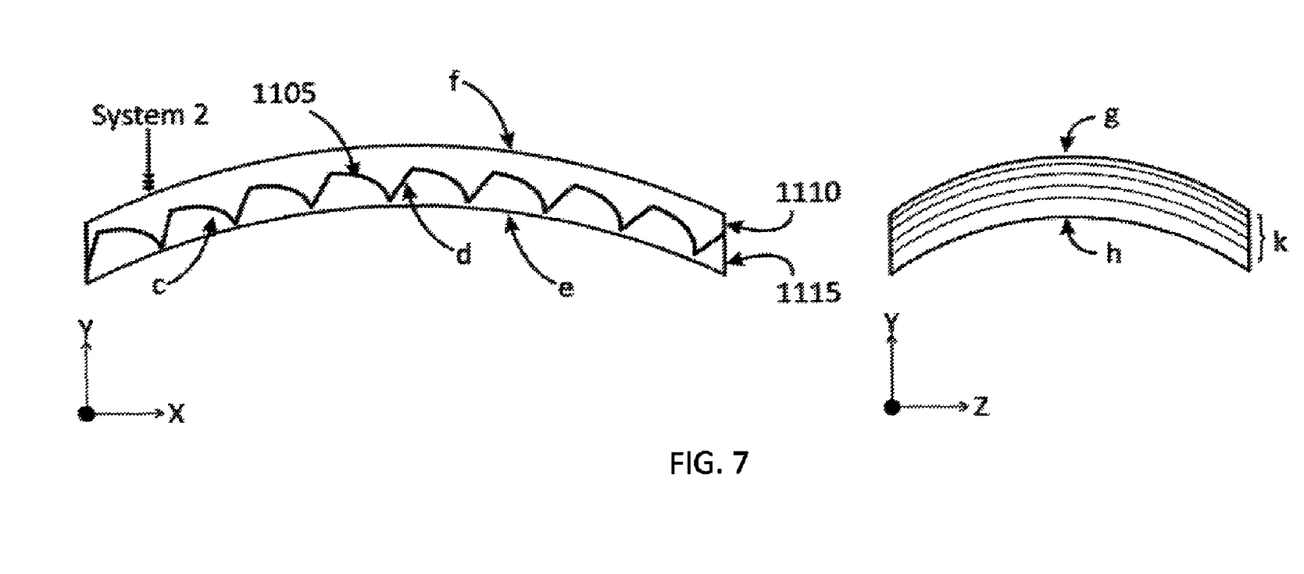
FIG. 7 shows another example of an embodiment of the invention, which is referred to as a curved embedded ridge reflector (CERR)

Side views of the structure of the CERR are shown FIG. 7 and the CERR is labeled as system 2. Like the FERR, it has an optically transparent ridged substrate 1115, a partially reflecting surface 1105 and an optically transparent superstrate 1110 that is a close index match to the substrate 1115.

Both the substrate and superstrate are characterized by specific curvature in the x, y and z directions of FIG. 7. The precise form of the curves varies depending on the specific optical design in which the CERR is incorporated.

Surfaces f, e, g and h have specific and individual characteristic equations that can be used to compensate for optical distortions as well as provide the basic curvature required for the optical magnification and vision (prescription) correction by giving the composite structure optical power. Specific characteristics of surfaces may be modeled by a variety of functions, including polynomial functions.

The curvature of surfaces f & e control the spherical power of how much ophthalmic correction is provided. Similarly the degree of curvature of surfaces g and h control the level of cylinder correction for astigmatic wearers.

Continuing with FIG. 7, the ridges may also have 3-dimensional high-order defining functions in the x, y and z directions. These are represented by the surfaces c, d and k. Surfaces d are the places where the divided surface are "reset" and are conveniently termed flyback surfaces. (analogous with a oscilloscope flyback on the old raster type devices). In one example, the flyback surfaces d are flat. Furthermore, surfaces c and d have the reflecting layer deposited on them or, in another example, the reflective layer may be omitted from flyback surfaces d.

Surface c in conjunction with surface f sets the main CERR focal length and power. The curvature of these surfaces may change over the width of the CERR (in the direction x) to compensate for increasing distance away from the projector.

FIG. 8 shows how the CERR may be used as a see-through optical module in conjunction with a freeform lens 1210 to provide for viewing of both the computer generated image and external scene. For clarity only the computer generated image rays are traced. The ridge reflectors have curved profiles that are dimensioned and arranged, in all spatial dimensions. The transparent substrate also has its own specific and curved properties in all spatial dimensions. The freeform nature of both the complimentary lens and the multitude of surfaces on and inside the optical module allow compensation and correction for various optical aberrations that affect an off-axis design.

Careful choice of surfaces f, e, g, h, c, d and k together with a good match of substrate-superstrate refractive indices makes the see-through external scene path clear without distortion or discontinuities. Furthermore, careful choice of surfaces f, e, g, h, c, d and k in conjunction with the corrective characteristics of freeform lens 1210 makes the computer generated image clear without distortion or discontinuities.

Advantageously, the freeform lens in conjunction with the CERR operate as an integrated optical system to deliver good CGI image.

Whilst large corrections (first & second order effects) to CERR aberrations are performed by the freeform lens some small residual aberrations may well remain that are beyond the capabilities of optical correction. In one example, the shape of the image forming device of the projector is adjusted to correct these residual aberrations. This is carried out in the electronic circuitry, such as a signal processing IC that drives the image forming device of the projector. The electronic circuitry is configured to pre-condition the image forming device of the projector such that after optical conditioning residual aberrations are reduced.

Figure 10:
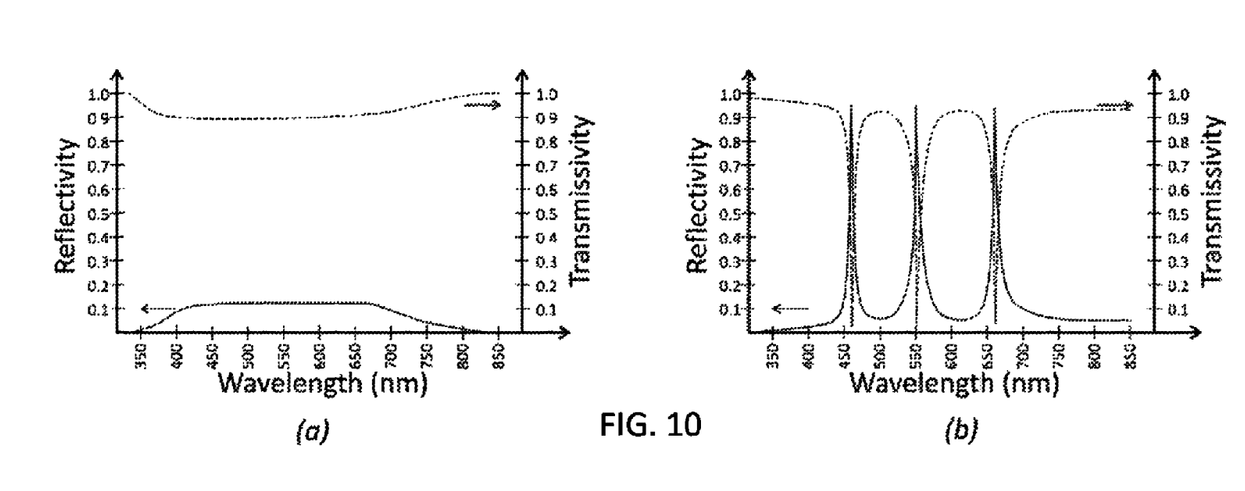
FIG. 10 shows the characteristics two types of optical reflection coatings suitable for use in the invention.

The reflective layer 1105, may be either a simple metallic film type with a broadband reflectivity characteristic of FIG. 10a. FIG. 10a shows an optical coating with a reflectivity of around 0.10-0.15 that is chosen to balance the intensity of the external and display images. Alternatively, in one embodiment the reflective layer formed on the inter-engaged ridged surfaces is a layer of air or air gap (not shown).

FIG. 10b shows a variant dielectric coating with three narrow reflectivity bands coincident with the three primary colors used in the projector.

Further, if coating 1105 is of a thin film type whose reflectivity may be controlled electrically then the ratio of brightness of the computer generated image and the external scene may be computer controlled.

Application of either coating can be performed using chemical or physical deposition techniques. Examples include chemical solution deposition, chemical vapor deposition including plasma enhanced chemical vapor deposition, thermal evaporation, RF sputtering, vapor deposition such as pulsed laser or cathodic arc deposition, electro-hydrodynamic deposition, dipping, spraying, spinning and ink jet coating.

Figure 9:
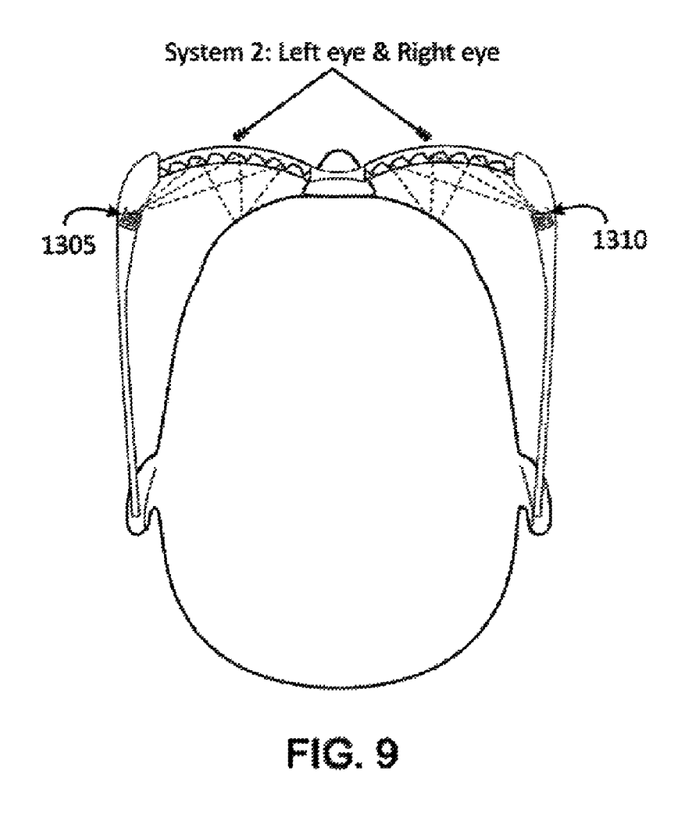
FIG. 9 is a diagram of how two CERRs may be incorporated into a glasses type head mounted display; according to an embodiment.

FIG. 9 shows another alternative embodiment of the invention. Two see-through optical modules comprising two CERRs optimized for right and left eyes are supported in an eyeglass frame. Also there are two projector sources 1305, 1310 that are mechanically and optically designed to fit in the form-factor envelope of the eyeglass frame.

Production methods for the FERR optical system 1 and CERR optical system 2 are similar so will only be described for the CERR for brevity. The multiple degrees of freedom in the substrate, superstrate and the ridges provide a powerful freeform optical structure that can be fabricated by machining or molding. Similarly the degrees of freedom provided by the freeform lens 1210 provide further opportunities for image optimisation.

Substrate 1110 and superstrate 1115 may be produced by direct machining using precision milling, turning, fly cutting, laser micromachining, electro-discharge machining and photolithography or a combination of techniques.

Alternatively the substrate and superstrate parts may be formed indirectly from an optically precise mould. Fabrication of the moulds may also use one of the aforementioned methods of fabrication.

Substrate 1115 is then coated with an appropriate reflective layer or layers. The final construction step is to optically bond the coated 1105 substrate 1110 with an index matched adhesive to the superstrate 1115.

Alternatively, the superstrate 1115, may be formed by encapsulating the coated 1105 substrate 1110 in a refractive index matched optical resin using an over-molding type process. In some examples an indexing matching material is not required, such as for example where the reflective layer is an air layer.

In yet another embodiment, there is provided a controller to pull the focus of the CGI from infinity to say 30 cm from the module. If a real object is far away then to have proper superposition the CGI has to be projected at infinity. A variable focus element is included in the freeform lens or projector optics and the controller is configured to adjust the focus down from infinity as needed. For example, consider say a virtual coke can on a real table 50 cm away, the variable focus element is controlled to bring the projector focus down to 50 cm to so that the can & table are both in same focal plane & sharp to the eye.

Figure 11:
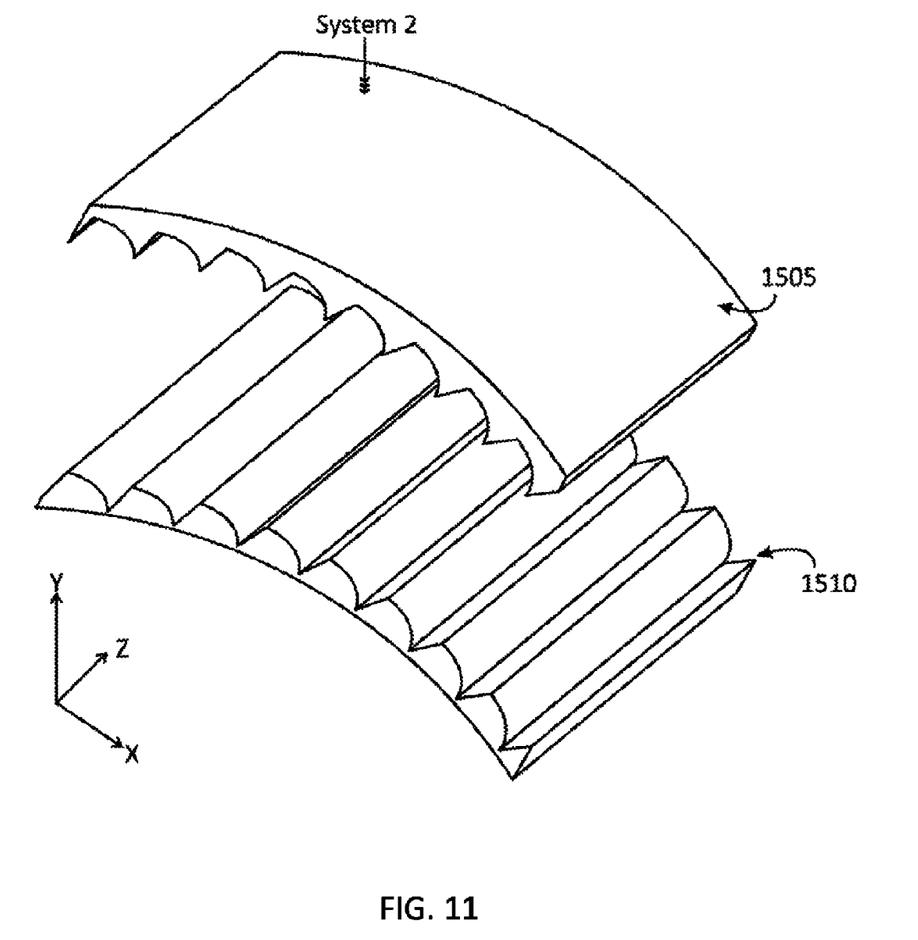
FIG. 11 shows one method of manufacture from two molded parts.

In yet another embodiment, a variable focus lens covers the full surface area of the module on the outer surface. Surface f in FIG. 11 is covered with a variable power lens (not shown). This would mean that the apparatus is usable by people with varying degrees of short & long sightedness. The notion can be extended to provide cylinder correction as well for astigmatic users.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. For example, the optical modules of the embodiments in some other examples are solely opaque to external-scenes (i.e. not see-through) to suit applications where only computer generated image need to be presented. This is achieved by for example depositing a non-transmitting reflective layer, electronically adjusting the reflective layer to be totally reflecting and non-transmitting, or blocking transmission of the rays to the reflecting layer. Furthermore the headmounted display sets may be visors, goggles or headband structures and are not limited to the particular types shown in the Figures. Likewise the shape of the substrate and superstrate may be oval, substantially rectangular, tear-shaped or any other lens shape.

The invention claimed is:

1. An optical apparatus comprising
  a curved embedded ridged reflector module, wherein said module comprises an optical substrate and optical superstrate having inter-engaging ridged surfaces with a freeform profile, wherein the interengaging ridged surfaces comprise alternating first surfaces and second surfaces and wherein at least said first surfaces are freeform curved;
  a reflective layer formed on at least one of said surfaces; said reflective layer being partially reflective and partially transmissive; and a complementary lens configured to receive a projected image, from a projector, and directs output rays from the projector onto the ridged surfaces on a first side of said module, wherein said module and said complimentary lens are arranged in an off axis optical configuration and wherein said complimentary lens is freeformed to pre-compensate for optical aberrations and distortions resulting from the embedded ridge reflector module such that in use, an augmented image, comprising reflected rays from the projector and transmitted rays from an object located on a second side of the module, is correctly presented to a viewer located on a first side of the module without further conditioning of the reflected rays.

2. An apparatus according to claim 1, wherein
said inter-engaged ridged surfaces are formed on flat planar inner faces of said optical substrate and optical superstrate.

3. An apparatus according to claim 1, wherein said substrate and superstrate in the module are freeform curved.

4. An apparatus according to claim 3 wherein said substrate has a freeformed curved outer face on said first side of said module, and wherein said superstrate has a freeformed curved outer face on said opposite side of said module.

5. An apparatus according to claim 1, wherein said reflector layer formed on said at least one surface comprises reflective material deposited on said at least one surface.

6. An apparatus according to claim 5 wherein said embedded ridge reflector further comprises indexing matching material located between the inter-engaged ridged surfaces.

7. An apparatus according to claim 1, wherein said reflective layer formed on said at least one surface comprises an air gap between said inter-engaged ridged surfaces.

8. An apparatus according to claim 1 wherein the ratio of reflectivity to transmission of said reflective layer is adjustable.

9. An apparatus according to claim 1 comprising a pair of said embedded ridged reflector modules; and a head mounted display; wherein said pair of embedded ridged reflector modules are supported on said head mounted display.

10. An apparatus according to claim 9 wherein motion sensors are arranged to detect motion about three independent axes.

11. An apparatus according to claim 1 wherein a nose bridge connects the pair of optical modules and permits signals to pass to and from each module.

12. An apparatus according to claim 1 wherein the outer faces of the substrate and superstrate in the optical module are freeform curved to enable fixed correction of complex vision defects such as astigmatism and presbyopia.

13. An apparatus according to claim 1 wherein the substrate and superstrate have a refractive index between 1.6-1.95.

14. An apparatus according to claim 1 wherein a characteristic dimension, such as a length/width or major/minor axis or diameter, of the substrate and superstrate, is between 20 mm and 100 mm.

15. An apparatus according to claim 1 wherein said reflective layer is selectively deposited on said interengageble ridged surfaces such that the reflective layer is omitted from flyback surfaces of said ridged surfaces.

16. An apparatus according to claim 1 further comprising an electronic circuitry for changing the shape of the image forming device of said optical projector to reduce residual aberrations after optical conditioning.

17. An apparatus according to claim 1 further comprising an electronic controllable variable focusing device arranged in the projected unreflected ray path for positioning the image plane of the computer generated image between infinity and about 30 cm from the front surface of the module.

18. An apparatus according to claim 1 comprising an electronic controllable variable focusing device provided on one or more surfaces of the embedded ridged reflector module for enabling adjustment of the image for in focus viewing by a long sighted or short sighted user or a user having astigmatic vision defects.

19. A system for controlling and operating projectors, which are located in a frame portion of a head mounted display, according to claim 9, includes a data transmitter, for transmitting data to a projector in the head mounted display.

20. A system according to claim 19 including a multiplexer for combining signals intended for left and right projectors separate optical fibres are provided for driving the left and right projectors in respective optical modules into a single optical fiber.

21. A system according to claim 19 including a multiplexer for combining signals intended for left and right projectors in respective optical modules.

22. An optical apparatus as claimed in claim 9, further comprising an eye tracking device included in said head mounted display for monitoring eye movement and providing a feedback signal.

23. A method of fabricating an optical embedded ridged reflector apparatus comprises the steps of:
 forming a curved embedded ridged reflector module, wherein forming said curved embedded ridged reflector module comprises:
 forming an optical substrate and optical superstrate; wherein forming said optical substrate and optical superstrate includes forming interengageable ridged surfaces with a freeform profile; wherein forming said interengagable ridged surfaces with a freeform profile comprises forming alternating first surfaces and second surfaces; said at least first surfaces being freeform curved;
 forming a reflective layer on at least one of said surfaces; wherein forming the reflective layer comprises forming a partially reflecting and partially transmissive reflective layer; and
 placing respective first and second inter-engagable ridged surfaces adjacent one another so as to achieve optical coupling;
 configuring a complimentary lens to receive a projected image, from a projector, and direct output rays from the projector onto the ridged surfaces on a first side of said curved embedded ridged reflector module, wherein configuring said complimentary lens includes freeforming said complimentary lens to pre-compensate for optical aberrations and distortions resulting from the embedded ridge reflector module; and
 arranging said module and said complimentary lens in an off axis optical configuration, whereby, in use, an augmented image, comprising reflected rays from the projector and transmitted rays from an object located on a second side of the module, is correctly presented to a viewer located on a first side of the module without further conditioning of the reflected rays.

24. A method according to claim 23, further comprising interposing an index matching material between said surfaces.

25. A method of claim 23 wherein forming said optical substrate and optical superstrate includes forming said inter-engaged ridged surfaces on flat planar inner faces of said optical substrate and optical superstrate.

26. The method of claim 23 wherein forming said optical substrate and optical superstrate having inter-engageable ridged surfaces comprises forming a freeform curved optical substrate and a freeform curved optical superstrate having said inter-engaged ridged surfaces on freeform curved inner faces of said optical substrate and optical superstrate.

27. A method of fabricating an optical module according to claim 26 wherein the substrate and superstrate are pressed and/or heated so that the substrate and superstrate take up the curvature of the master moulds.

28. A method of fabricating an optical module according to claim 23 further including the step of encapsulating a substrate in refractive index matched optical resin using an overmolding process.

* * * * *